Dec. 21, 1926. 1,611,617
I. K. TUERCK
CLUTCH MECHANISM FOR POWER TRANSMISSION GEARING AND THE LIKE
Filed July 14, 1924 2 Sheets-Sheet 2
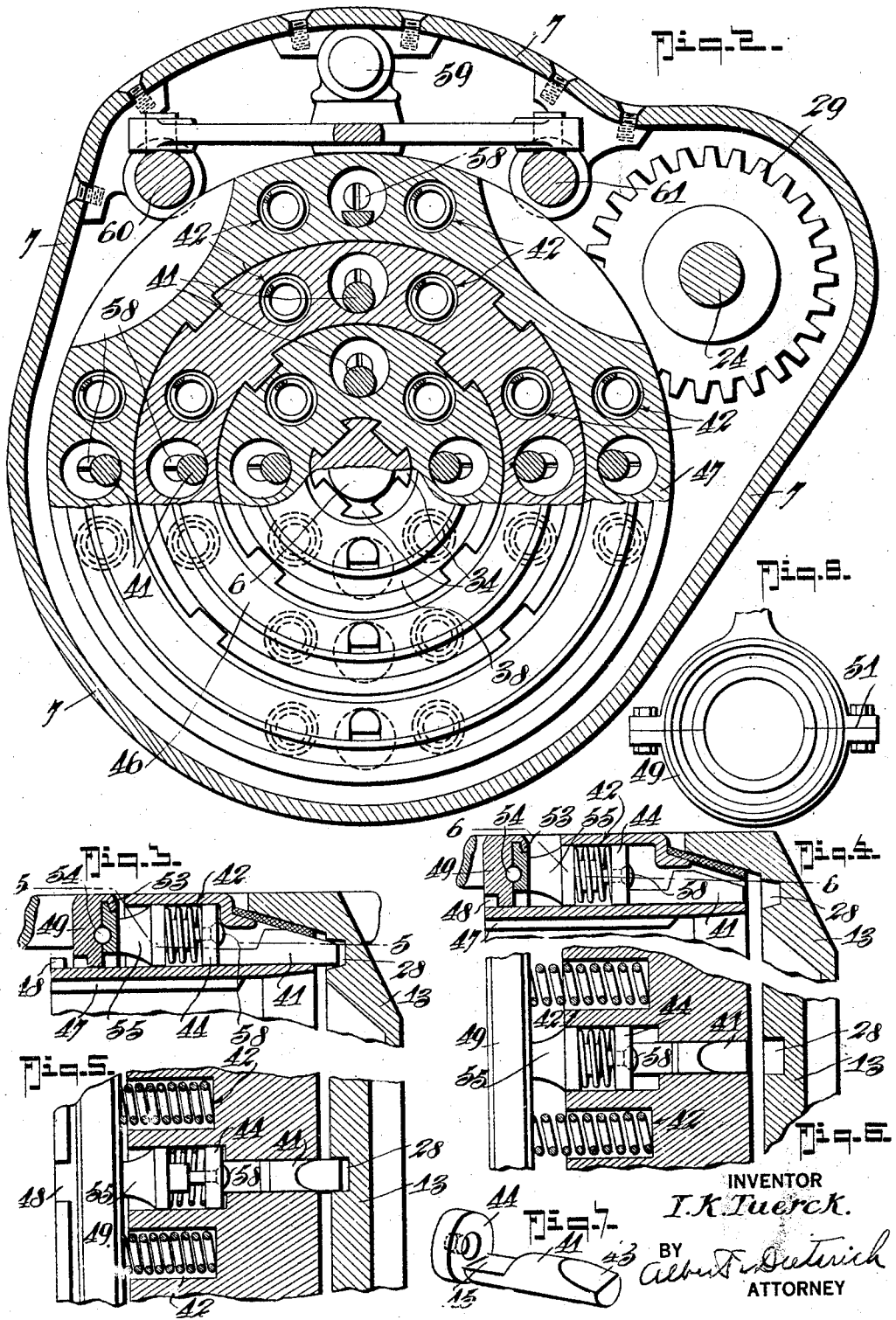
INVENTOR
I. K. Tuerck.
BY
Albert F. Dieterich
ATTORNEY Patented Dec. 21, 1926.

1,611,617

UNITED STATES PATENT OFFICE.

IOHAN KONRAD TUERCK, OF PORTLAND, OREGON.

CLUTCH MECHANISM FOR POWER-TRANSMISSION GEARING AND THE LIKE.

Application filed July 14, 1924. Serial No. 726,037.

My present invention relates to certain new and useful improvements in clutch mechanism, especially designed and adapted for use in power transmission gearing, and it has for its object to provide a mechanism of such construction that by the use of the same in connection with a power transmission gearing there will be provided a strong, durable, inexpensive and fool-proof mechanism of such structure that the employment of the usual clutch between the engine shaft and the driving shaft may, if desired, be dispensed with, thereby reducing the foot-labor of the operator since he can effect the shifting of the gears solely by manipulating the gear shifting lever, and he may do this without danger of breaking the gears; other objects and advantages of the invention will be clear to those skilled in the art.

In its more detailed nature the invention also embodies those novel features of construction, combination and arrangement of parts, all of which will be first fully described, then be particularly pointed out in the appended claims, reference being had to the accompanying drawings, in which:

Figure 2 is a cross section taken substantially on the line 2—2 of Figure 1.

Figure 3 is a fragmentary section illustrating a position of one of the shiftable elements, the cone clutch element being shown engaged and the finger-locking action also being shown.

Figure 4 is a view similar to Figure 3 the cone clutch element being shown engaged and the finger-lock element being shown disengaged.

Figure 5 is a horizontal section taken on the line 5—5 of Figure 3.

Figure 6 is a horizontal section taken on the line 6—6 of Figure 4.

Figure 7 is a detail perspective view of one of the lock fingers.

Figure 8 is a detail elevation of one of the shifting rings.

Figure 1:
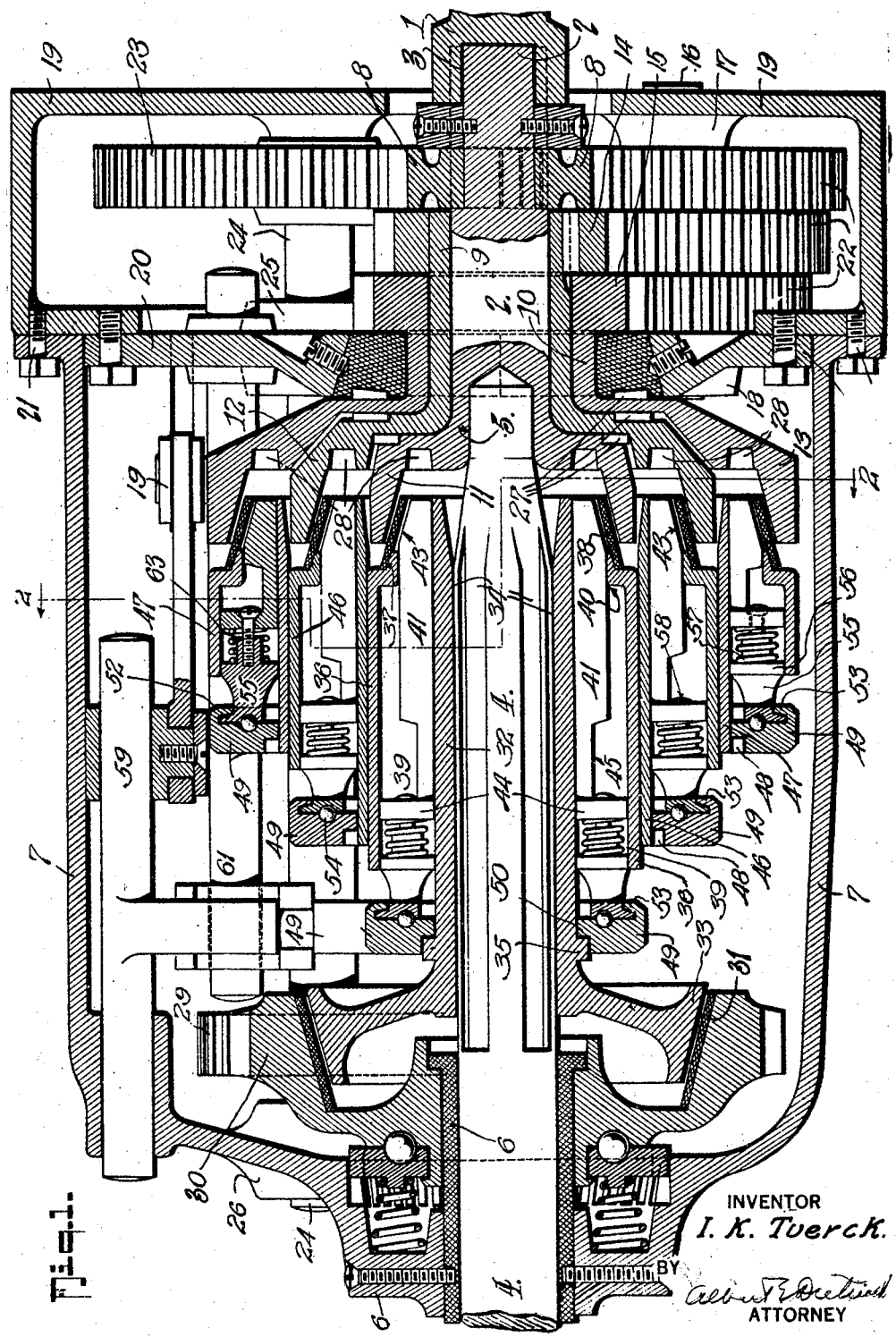
Figure 1 is a central vertical longitudinal section of a power transmitting mechanism embodying the invention.

In the drawings 1 designates an engine shaft which may be coupled with the driving shaft 2 of the power transmission mechanism in any suitable manner, as by a male and female coupling indicated at 3 in Figure 1 of the drawings.

The driven shaft is indicated at 4 and is adapted to connect with the universal joint (not shown) when used in a motor vehicle. The forward end of the shaft 4 projects into a recess 5 in the shaft 2 thus having bearing therein, and the other end of the shaft has suitable bearing as at 6 in the end of the main housing 7.

A driving pinion 8 is secured on the shaft 2 and a sleeve 9 has rotatable bearing on that shaft 2 and is hereinafter termed the "second speed" sleeve. Mounted on the "second speed" sleeve 9 is another sleeve 10 hereinafter termed the "low speed" sleeve.

The driving shaft 2 is provided with a female clutch member 11. The "second speed" sleeve 9 is also provided with a female clutch member 12 and the "low speed" sleeve 10 is provided with a female clutch member 13.

A gear 14 is keyed on the sleeve 9 and 15 designates a gear formed on the sleeve 10. A countershaft 16 is provided and is mounted in bearings 17 and 18 carried by the auxiliary housing 19 and the end wall 20 respectively, said housing being secured to the main housing as at 21. Keyed to the countershaft 16 are varied sized gears 22 which mesh with the gears 8, 14 and 15 hereinbefore referred to, and the largest gear 22 meshes with the gear 23 on the reversing shaft 24 having bearing at 25 in the wall 20 and at 26 in the housing 7.

Suitable anti-friction bearings 27 are interposed between the thrust faces of the several female clutch elements 11, 12 and 13 and between the female clutch element 13 and the bearing face of the wall 20, as shown.

The female clutch elements 11, 12 and 13 are each provided with finger receiving pockets or recesses 28 of which more will be said later.

On the reversing shaft 24 is located a pinion 29 which meshes with the driven gear 30. The gear 30 is provided with a female clutch face 31 and may be rotatable upon the bearing for the rear end of the shaft 4 and yieldably mounted, if desired, in the manner indicated.

Longitudinally slidably mounted on the shaft 4, but rotatable with the same, is a sleeve 32 on the rear end of which is a male clutch element 33 designed to cooperate with the clutch face 31 of the gear 30 and thereby clutch that gear to turn with the shaft 4 when desired (reverse action). In order to allow longitudinal movement of the sleeve 32 on the shaft 4 and yet cause the two to rotate together as one, the shaft and sleeve have tongue and groove connections 34. The sleeve 32 is provided with an annular abutment shoulder or flange 35, the purpose of which will presently appear. It is also provided with an enlarged body part 36, the front end of which is coned, as at 37, to constitute the male clutch element which is covered by a suitable band 38 and which is adapted to cooperate with the female clutch member 11.

The body 36 is provided with a plurality of finger receiving bores or pockets 39. The body 36 is also provided with bores 40 which are offset or eccentric to the pockets 39 and through which the locking fingers 41 are adapted to be projected in a manner presently to be described.

The body portion 36 is also provided with a plurality of spring pockets 42 of which more will be said later. The locking fingers 41 each include a substantially flat top surface 43, a circular head 44 and a cut out portion 45.

The shiftable element for the "second speed" is designated 46, and 47 designates the shiftable element for the third speed. The construction of the shiftable elements 46 and 47 is substantially the same as that of the shiftable element 32, excepting that they are not provided with a clutch member 33. Each of the shiftable elements 46 and 47 is provided with an abutment flange 48 corresponding in purpose and function to the annular abutment flange 35 hereinbefore referred to.

The numeral 49 indicates the shifting collars or rings, there being one for each shiftable element and these rings are shouldered as at 50, to abut the rings 35 and 48 of their respective units. The several shifting members 49 are made in two parts, as at 51, and secured together in such manner that they may be mounted over the finger carrying rings 52, the rings 49 having lips 53 to project over the said rings 52.

Suitable anti-friction bearings 54 are provided between the thrust faces of the rings 49 and 52. From each ring 52 there projects a set of pins 55 which have shoulders 56 against which the springs 57 abut. Screws 58 passing through the circular heads 44 are tapped into the ends of the pins 55 and form guides for the fingers, the arrangement being such that a limited movement of the fingers on the screws along the direction of their axes may be had against the tension of the springs 57 after the clutch has been applied, as will be more clear hereafter.

Suitable slide rods 59, 60 and 61 may be employed for effecting the "high, second and low" speed shifting actions respectively. Any suitable means for shifting the rods can be employed but as such devices form no part of my present invention no further detailed disclosure thereof is deemed necessary.

The several shiftable members 32, 46 and 47 respectively have tongue and groove connections 62 (best shown in Figure 2) whereby the several shiftable elements may have longitudinal or axial movement and yet rotate together as a unit.

It will be observed by reference to Figure 1 of the drawings that the pins 55 also have shoulders or extensions 63, the purpose of which will become apparent in the description of the operation of the device immediately following this paragraph.

In explaining the operation of the device, we will first assume the parts to be in the position indicated in Figure 1 which is the neutral position for all parts, none of the clutches being engaged. With this arrangement, the shaft 4 may remain stationary while the shaft 2 turns under the power of the engine shaft 1. When it is desired to throw the mechanism into "low gear" the operator manipulates such shifting devices as may be provided to shift the proper slide rod and cause movement of the shifting unit 47 to bring its clutch face into engagement with the clutch face 13.

The first part of the movement of the unit 47 forwardly takes place until the ring 49, pressing through the medium of the springs in the pockets 42 forces the clutch band 38 of that unit into frictional contact with the female clutch element 13, by which contact the movement of the shiftable member 47 is arrested. Further movement of the ring 49 forwardly causes the fingers 41 of that unit to be pressed against the opposing wall of the clutch member 13 until the pockets 28 align with the fingers, whereupon the fingers enter the pockets 28 and lock the parts to the clutched position. The provision of the springs 57 allows sufficient yield to prevent the fingers becoming broken or damaged and permitting them automatically to find their places within the recesses 28 and on completion of the forward movement the shoulders 63 engage the heads 44 of the pins and effect a positive holding of the pins in the recesses.

As the action of the other shifting elements for bringing the "second" and "high or third" speeds into action is the same as that before described, detailed description of each of these functions is deemed unnecessary and is therefore not made.

When it is desired to effect a reversing action the sleeve 32 is, of course, moved in the direction for causing the male and female clutch elements 33 and 31 to frictionally engage.

Attention is called to the fact that by the employment of cone clutches and locking pin devices for each forward speed mechanism, it is possible for the male and female clutch elements to engage smoothly and their speeds of rotation to be brought practically into unison before the locking fingers or pins come into action. Conversely, by my arrangement the locking fingers are withdrawn before the clutching faces are disconnected and further withdrawal movement of the locking fingers results in the disengagement of the clutch faces. This makes the action both smooth and noiseless.

While I have shown and described my present invention as used in connection with power transmission gearing I make no claim in this application to such gearing.

From the foregoing description, taken in connection with the accompanying drawings, it is thought that the novel details of construction, the manner of operation and the advantages of my invention will be clear to those skilled in the art to which it relates.

What I claim is:

1. In power transmitting mechanism, a driving shaft and a driven shaft journalled in suitable bearings, a shiftable element slidably mounted on and turning with said driven shaft and having a cone clutch face, a clutch element on said driving shaft having a cone face to cooperate with said clutch face, means to shift said shiftable element to bring its clutch face into action, said shiftable element including a body having pockets extending through the cone clutch face, fingers slidably mounted in said pockets and adapted to project through the cone clutch face, said driving shaft clutch element having finger recesses, and means to hold said fingers in a retracted position until the clutch faces of the driving shaft and the shiftable element are engaged.

2. In power transmitting mechanism, a driving shaft and a driven shaft journalled in suitable bearings, a shiftable element slidably mounted on and turning with said driven shaft and having a clutch face, a clutch element on said driving shaft to cooperate with said clutch face, means to shift said shiftable element to bring said clutch face into action, said shiftable element including a body having pockets, fingers slidably mounted in said pockets, said driving shaft clutch element having finger recesses, and means to hold said fingers in a retracted position until the clutch elements of the driving shaft and the shiftable element are engaged; said shiftable element including a friction band, and said fingers when projected being arranged to engage and expand said friction band substantially as shown and described.

3. In power transmitting mechanism, a driving shaft and a driven shaft journalled in suitable bearings, one of said shafts having a bearing for the other shaft, a shiftable element mounted on said driven shaft, a member which includes a clutch element mounted on said driving shaft to oppose said shiftable element and adapted to cooperate with said shiftable element, means for shifting said shiftable element, said shiftable element including a cone clutch portion and locking fingers, and means for normally holding said locking fingers retracted, said shifting means including a device for shifting said shiftable element first to bring said cone clutch portion into action, and then to project said fingers, the member which opposes the cone clutch portion and the fingers having cooperating parts for the purposes specified, and said shiftable element having openings through which said fingers may be projected to engage the cooperating parts of said member which is mounted on said driving shaft.

4. In power transmitting mechanism, the combination with a driving and a driven shaft, a female clutch element carried by said driving shaft, a shiftable element mounted to turn without having longitudinal movement on said driven shaft, said shafts being mounted in alignment, said shiftable element comprising a body having a male clutch portion to enter said female element and engage with the same, said body having a pull-back flange, a shifting ring associated with said body and its flange and having limited axial movement along said body, compression springs interposed between said body and ring to tend always to hold said ring against said flange, and means to shift said ring to engage and disengage the clutch elements.

5. In power transmitting mechanism, the combination with a driving and a driven shaft, a female clutch element carried by said driving shaft, a shiftable element mounted to turn with but having longitudinal movement on said driven shaft, said shafts being mounted in alignment, said shiftable elements comprising a body having a male clutch portion to enter said female element and engage with the same, said body having a pull-back flange, a shifting ring associated with said body and its flange and having limited axial movement along said body, compression springs interposed between said body and ring to tend always to hold said ring against said flange, and means to shift said ring to engage and disengage the clutch elements, a second ring engaged with said first mentioned ring but rotatable with respect thereto, studs carried by said second ring, locking fingers mounted slidably on said studs, springs tending to project the said fingers from said studs, said shiftable element having finger retaining pockets and said female clutch element having locking recesses to receive said fingers.

6. In power transmitting mechanism, the combination with a driving and a driven shaft, a female clutch element carried by said driving shaft, a shiftable element mounted to turn with but having longitudinal movement on said driven shaft, said shafts being mounted in alignment, said shiftable element comprising a body having a male clutch portion to enter said female element and engage with the same, said body having a pull-back flange, a shifting ring associated with said body and its flange and having limited axial movement along said body, compression springs interposed between said body and ring to tend always to hold said ring against said flange, and means to shift said ring to engage and disengage the clutch elements, a second ring engaged with said first mentioned ring but rotatable with respect thereto, studs carried by said second ring, locking fingers mounted slidably on said studs, springs tending to project the said fingers from said studs, said shiftable element having finger retaining pockets and said female clutch element having locking recesses to receive said fingers, said clutch portion comprising a friction band, and said fingers when projected having provision to engage and expand said friction band substantially as shown and described.

7. In power transmitting mechanism, the combination with a driving and a driven shaft, a female clutch element carried by said driving shaft, a shiftable element mounted to turn with but having longitudinal movement on said driven shaft, said shafts being mounted in alignment, said shiftable element comprising a body having a male clutch portion to enter said female element and engage the same, said body having a pull-back flange, a shifting ring associated with said body and its flange and having limited axial movement along said body, compression springs interposed between said body and ring to tend always to hold said ring against said flange, and means to shift said ring to engage and disengage the clutch elements, a second ring engaged with said first mentioned ring but rotatable with respect thereto, studs carried by said second ring, locking fingers mounted slidably on said studs, springs tending to project the said fingers from said studs, said shiftable element having finger retaining pockets and said female clutch element having locking recesses to receive said fingers, said male clutch portion comprising an expansible member adapted to be expanded when said fingers are projected, substantially as shown and described.

8. In power transmitting mechanism, a driving shaft and a driven shaft journalled in suitable bearings, a shiftable body slidably mounted on and turning with said driven shaft, and including a cone-clutch face, a clutch element on said driving shaft having a cone-clutch face to project over the cone-clutch face of the shiftable element, an expanding band on the cone-clutch face of the shiftable element, said shiftable element including a body with pockets, fingers slidably mounted in said pockets, said pockets intersecting the cone-clutch face of said shiftable element, whereby when said fingers are projected they will expand the band into engagement with the opposing clutch element, a shifting ring mounted on the slidable element, said slidable element having recesses, springs mounted in said recesses to engage said shifting ring to hold the fingers withdrawn, and a yieldable connection between said fingers and said shifting ring.

IOHAN KONRAD TUERCK.